(12) United States Patent
Lamparter

(10) Patent No.: US 6,254,151 B1
(45) Date of Patent: Jul. 3, 2001

(54) MOUNTING ARRANGEMENT FOR CROSSING ARM

(75) Inventor: Ronald C. Lamparter, Grosse Pointe Shores, MI (US)

(73) Assignee: Transpec, Inc., Sterling Heights, MI (US)

( * ) Notice: Subject to any disclaimer, the term of this patent is extended or adjusted under 35 U.S.C. 154(b) by 0 days.

(21) Appl. No.: 09/088,030

(22) Filed: Jun. 1, 1998

(51) Int. Cl.$^7$ .................................................. B60R 19/48
(52) U.S. Cl. .......................................... 293/117; 116/28 R
(58) Field of Search ............................... 293/9, 117, 118, 293/142, 143; 116/28 R; 280/502; 224/512, 513

(56) References Cited

U.S. PATENT DOCUMENTS

| | | | |
|---|---|---|---|
| 1,159,662 | * 11/1915 | Griffith | 293/118 |
| 1,557,410 | * 1/1925 | Breslav | 293/118 |
| 2,027,852 | * 1/1936 | Allan | 280/502 X |
| 3,153,398 | 10/1964 | La Verne Runkle et al. . | |
| 3,302,958 | * 2/1967 | Fawcett et al. | 280/502 X |
| 4,138,668 | 2/1979 | Latta, Jr. et al. . | |
| 4,204,701 | 5/1980 | Oltrogge . | |
| 4,227,729 | * 10/1980 | Schumacher | 224/513 X |
| 5,199,754 | 4/1993 | Freeman . | |
| 5,357,239 | 10/1994 | Lamparter . | |
| 5,564,359 | 10/1996 | Harder . | |

FOREIGN PATENT DOCUMENTS

2276198 * 2/1976 (FR) ..................................... 293/117

\* cited by examiner

*Primary Examiner*—Dennis H. Pedder
(74) *Attorney, Agent, or Firm*—Reising, Ethington, Barnes, Kissellle, Learman & McCulloch

(57) ABSTRACT

A crossing arm assembly that pivotally attaches to a bumper at the front end of a vehicle such as a bus to block pedestrian traffic from crossing immediately in front of the vehicle when the vehicle is stopped. The assembly includes a mounting bracket configured to fixedly mount to the front bumper of a vehicle, the front bumper having a front surface having a profile common to the bumpers of other vehicles of the same make and model. The assembly also includes an elongated beam having an inner end pivotally supported on the mounting bracket. The bracket includes a back surface having a non-planar profile contoured to complement the profile of the front surface of the bumper. The assembly is made by providing a mounting bracket having a back surface profile contoured to complement the non-planar front surface profile of the bumper of the make and model of vehicle the assembly is to be mounted to. The beam is pivotally supported on the mounting bracket either before or after the mounting bracket is fastened to the bumper.

9 Claims, 4 Drawing Sheets

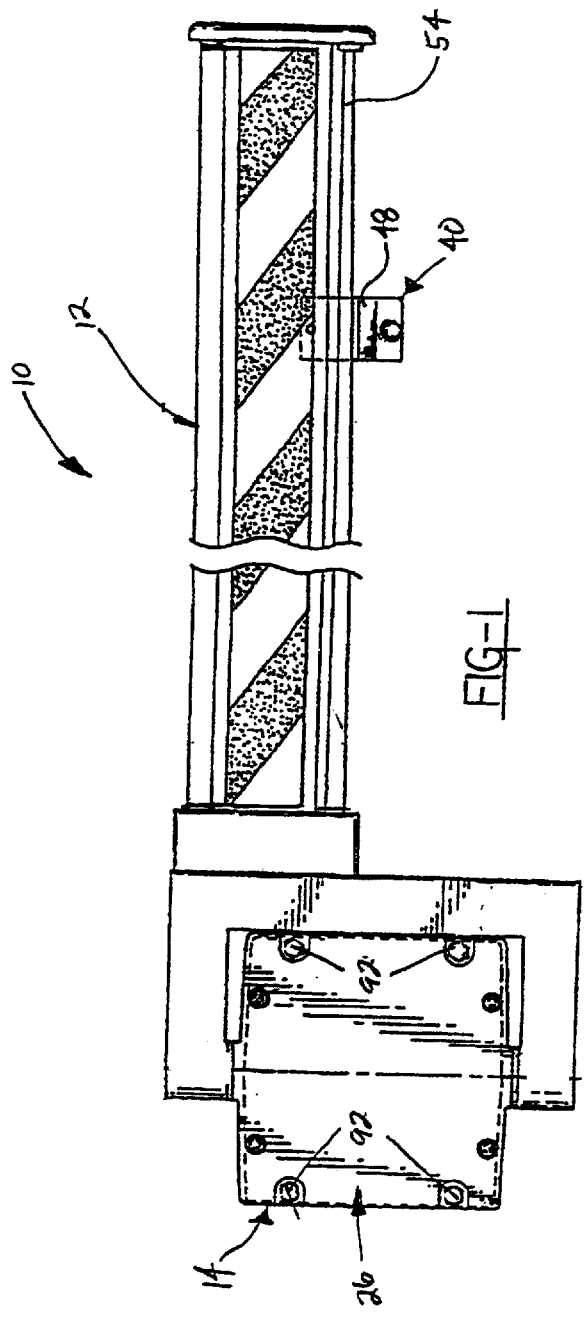
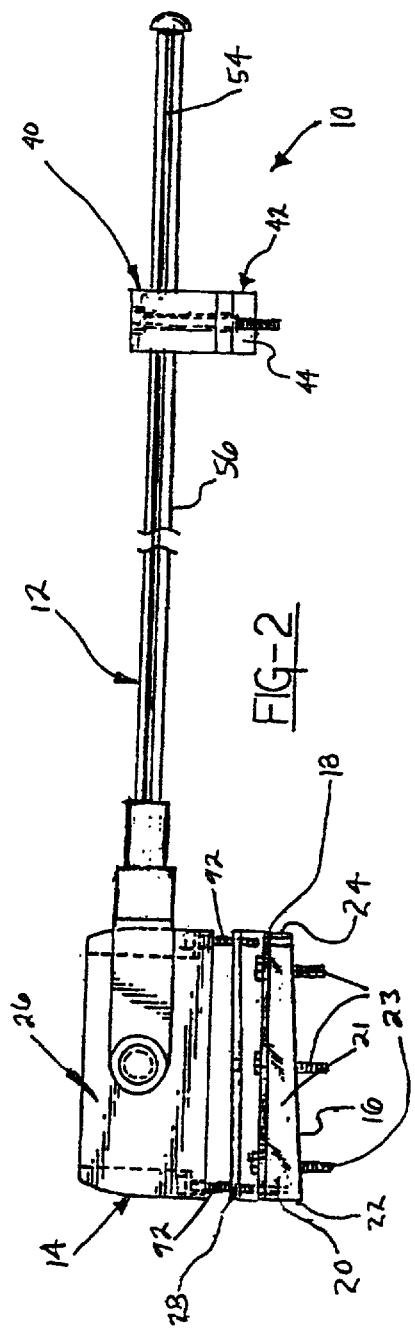

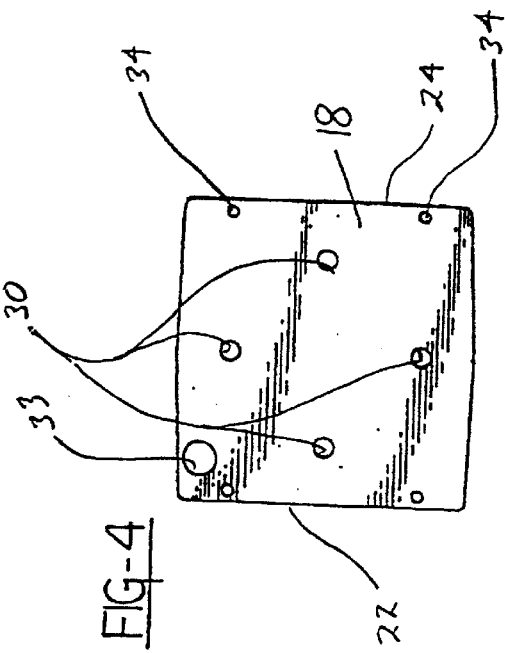
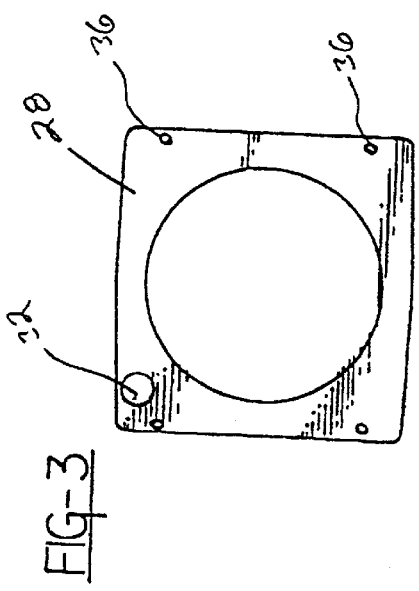
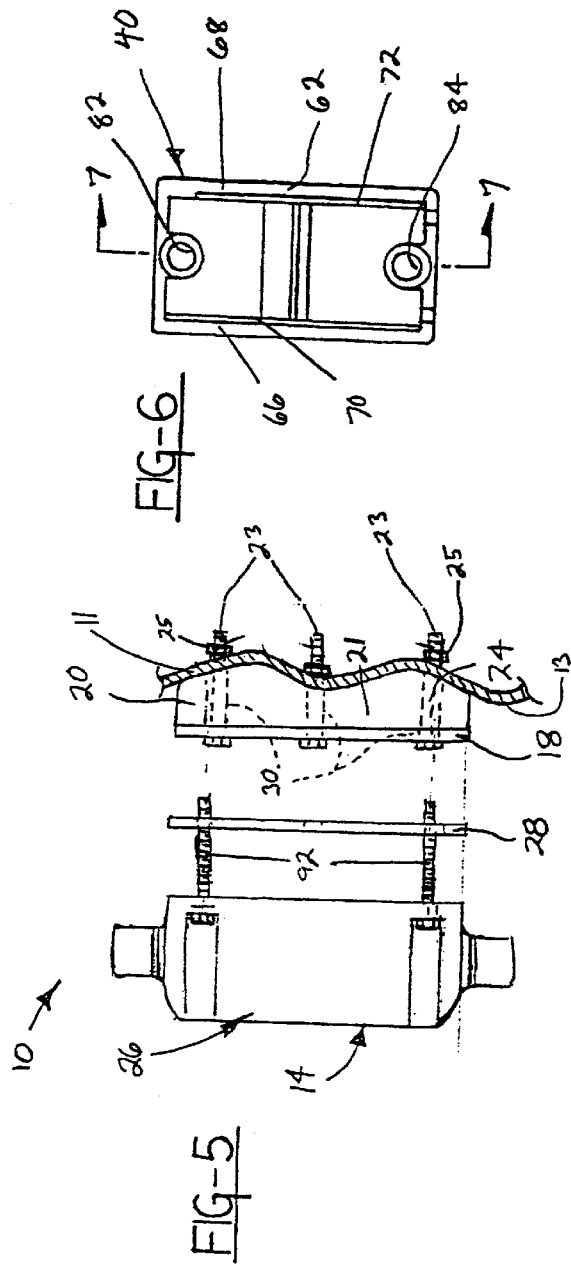

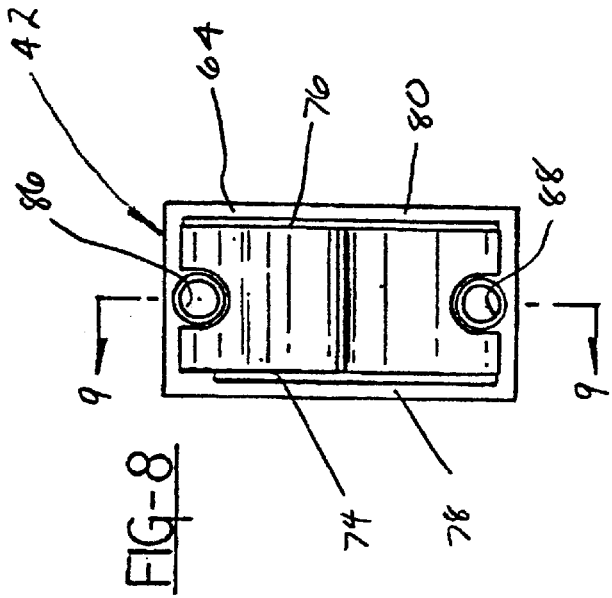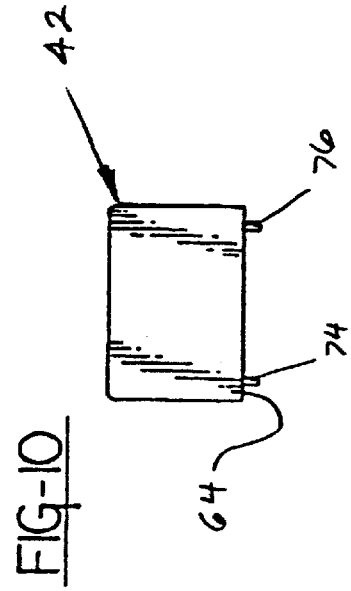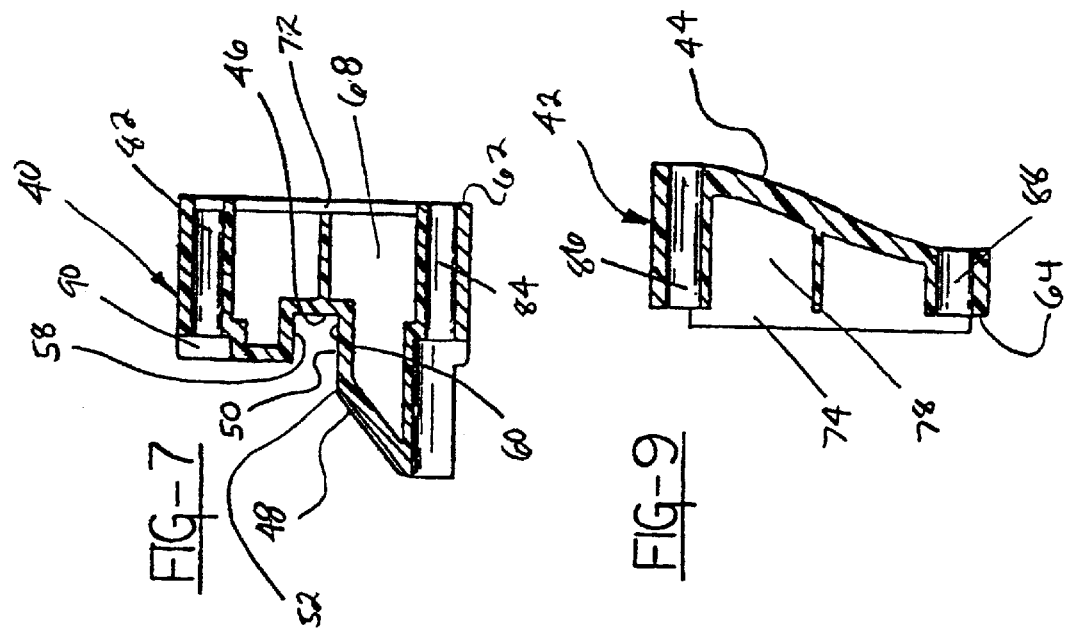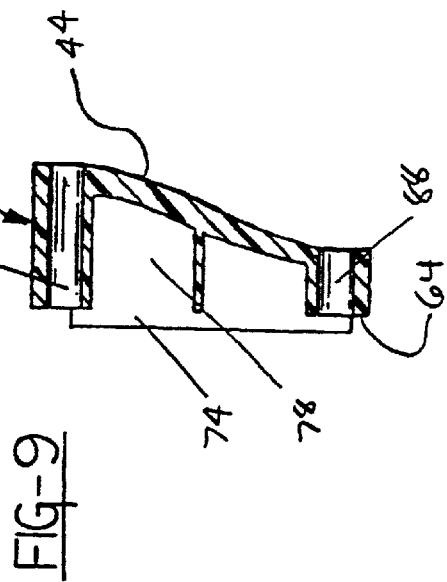

MOUNTING ARRANGEMENT FOR CROSSING ARM

TECHNICAL FIELD

This invention relates generally to safety equipment for school busses and more particularly to a mounting arrangement for a crossing arm assembly configured to mount on the front end of a school bus.

INVENTION BACKGROUND

School bus crossing arms are designed to extend to a perpendicular position relative to a front bus bumper when a school bus stops to pick up or discharge passengers. In this perpendicular position, such a crossing arm will block arriving and departing passengers from crossing immediately in front of a school bus and below the bus driver's field of vision. U.S. Pat. No. 5,357,239, granted to me Oct. 18, 1994, shows such a crossing arm assembly, or "safety gate," pivotally mounted to a housing or mounting bracket. The mounting bracket includes a single flat back plate that fixedly mounts to the front bumper of a vehicle. The back plate includes holes or slots for receiving mounting bolts.

U.S. Pat. No. 3,153,398, granted Oct. 20, 1964 to George LaVerne Runkle and Gilbert S. Sheets, discloses a crossing arm assembly having a crossing arm shaped to fit in an elongated recess in the front bumper of a bus. The assembly also includes a rubber guard structure that has a hollow rectangular center portion that is cemented to the channel section and flange portions that seal off the bumper recess. A disadvantage of this crossing arm assembly is that the bumper must be modified to include an elongated recess.

U.S. Pat. No. 4,204,701 issued May 27, 1980 to Oltrogge (the Oltrogge patent) discloses a universal vehicle accessory attachment. The attachment includes an elongated, vertically-oriented mounting bracket or frame having a profile contoured to conform to the profile of the front surface of a bumper. However, the Oltrogge bracket is not configured to pivotally support a crossing arm beam or to significantly dampen vibrations transmitted between the vehicle bumper and the bracket.

U.S Pat. No. 5,564,359 issued Oct. 15, 1996 to Harder (the Harder patent) discloses a bumper-mounted guide that helps support the free end of a cantilevered, pivotally mounted crossing arm in a stowed position against a bus bumper. The guide includes a ramped guide surface positioned to receive and guide a slightly sagging crossing arm upward into the stowed position as the arm swings inward against the bumper.

A disadvantage of the Harder bumper-mounted guide design is that, when the crossing arm is in the stowed position, the ramped guide surface tends to urge the arm to slide outward and away from the bumper. In addition, the Harder guide and bumper bracket could not fit flush against the front surface of a bus bumper that has anything other than a flat profile. In addition, the Harder bumper bracket could not significantly dampen vibrations transmitted between the bus and the crossing arm assembly.

What is needed is a mounting arrangement for a crossing arm assembly that includes a mounting bracket that pivotally supports a cantilevered crossing arm and has a profile contoured to conform to the profile of a bumper.

INVENTION SUMMARY

In accordance with this invention a crossing arm assembly mounting bracket is provided that includes a back surface having a non-planar profile contoured to complement the profile of the front surface of the bumper the bracket is to be mounted on. The mounting bracket is part of a crossing arm assembly that pivotally attaches to a bumper at the front end of a vehicle such as a bus. The crossing arm assembly also includes an elongated beam having an inner end pivotally supported on the mounting bracket. The crossing arm beam swings out to block pedestrian traffic from crossing immediately in front of the vehicle when the vehicle is stopped. When bolted together, the complementary contours of the mounting bracket and bumper provide a strong mechanical interlock that resists the downward movement that the cantilevered beam applies to the mounting bracket.

According to another aspect of the invention, the mounting bracket includes a bracket adapter. The contoured back surface of the bracket is part of the bracket adapter.

According to another aspect of the invention, the bracket adapter is configured to be interchangeable with other bracket adapters that have different back surface profiles. The back surface profiles of the different adapters are contoured to conform to correspondingly different front surface bumper profiles of various vehicle makes and models.

According to another aspect of the invention, the bracket adapter comprises a vibration dampening material such as structural foam. The vibration dampening material dampens vibrations transmitted between the bus and the crossing arm assembly. The material also helps distribute compressive loads applied by fasteners such as bolts that hold the bracket to a bumper. Still further, the material helps distribute shear loads applied by the cantilevered beam to the mounting bracket.

According to another aspect of the invention, the bracket adapter includes a bracket main body and a gasket configured to mount between the bracket main body and the bumper, e.g., between the bracket main body and the bracket adapter. The gasket is made of a vibration dampening material such as neoprene. The gasket serves to further dampen vibrations transmitted between the crossing arm assembly and the vehicle and distribute fastener loads.

According to another aspect of the invention, the bracket adapter has a thickness, the thickness being tapered from a laterally outer edge of the bracket adapter to a laterally inner edge of the bracket adapter. The taper compensates for the "sweep" of the bumper, i.e., the bumper's curvature and angle relative to a central longitudinal vehicle axis. In so doing, the bracket adapter allows the crossing arm beam to lie perpendicular to a central longitudinal vehicle axis when the beam is in the stowed position.

According to another aspect of the invention, the guide comprises a back surface and a front surface disposed opposite the back surface. The back surface is configured to attach to the bumper at a location spaced laterally from the bracket. In addition, a generally upward-facing ramped surface extends outward and downward from the front surface. The ramped surface is positioned to receive and guide the crossing arm beam upward into the stowed position as the beam swings inward against the bumper.

According to another aspect of the invention, the guide includes a generally horizontal upward-facing surface extending between the front surface and an inner upper end of the ramped surface. The horizontal upward-facing surface helps support the free end of the crossing arm beam in the stowed position.

According to another aspect of the invention, the guide back surface has a non-planar profile contoured to conform to the profile of the non-planar front surface of the bumper. As with the mounting bracket, when the guide is bolted to the bumper, the complementary contours of the guide and bumper provide a strong mechanical interlock.

According to another aspect of the invention, the guide includes a guide adapter. The contoured back surface of the guide is disposed on the guide adapter. As with the mounting bracket, this allows a single adapter design to be adapted to various bumper configurations by attaching a guide adapter that has a profile corresponding to the bumper profile of whatever vehicle the guide is to be mounted to. In other words, the guide adapter is configured to be interchangeable with other guide adapters having different back surface profiles contoured to conform to correspondingly different front surface profiles.

According to another aspect of the invention, the guide adapter comprises a vibration dampening material. As with the bracket adapter, this is to dampen vibrations transmitted between the bus and the crossing arm assembly.

According to another aspect of the invention, the beam includes a longitudinal protrusion that extends laterally inward toward the bumper from a bumper-side of the beam. The guide includes a downward-facing generally horizontal surface extending outward from the front surface. This downward15 facing horizontal surface is spaced opposite the upward-facing horizontal surface to form a guide socket. The guide socket is dimensioned to receive the beam protrusion when the beam is in the stowed position. This prevents the beam from bouncing on the guide when the vehicle is under way.

According to another aspect of the invention a method is provided for making a crossing arm assembly that pivotally attaches to a bumper at the front end of a vehicle such as a bus. The crossing arm assembly made by this method comprises a mounting bracket having a non-planar back surface configured to fixedly mount to a vehicle front bumper that has a front surface having a profile common to the bumpers of other vehicles of the same make and model. The assembly also includes an elongated beam having an inner end pivotally supported on the mounting bracket. According to the method a mounting bracket is provided that has a back surface profile contoured to complement the nonplanar front surface profile of the bumper of the make and model of vehicle the assembly is to be mounted to. The beam is then pivotally supported on the mounting bracket either before or after the mounting bracket is attached to a vehicle bumper.

According to another aspect of the invention, the method for making the crossing arm mounting bracket includes the providing of a bracket main body and a bracket adapter, the back surface of the mounting bracket disposed on the bracket adapter. The bracket adapter is then attached to the bracket main body and the beam is pivotally supported on the bracket main body.

BRIEF DESCRIPTION OF THE DRAWINGS

To better understand and appreciate the invention, refer to the following detailed description in connection with the accompanying drawings:

FIG. 1 is a front view of a crossing arm assembly including a mounting arrangement constructed according to the present invention;

FIG. 2 is an exploded bottom view of the crossing arm assembly of FIG. 1;

FIG. 3 is a front view of a gasket portion of the mounting arrangement of FIGS. 1 and 2;

FIG. 4 is a front view of a bracket adapter portion of the mounting arrangement of FIGS. 1 and 2;

FIG. 5 is an exploded partial cross-sectional side view of the crossing arm assembly of FIG. 1 with a bracket adapter portion of the assembly bolted to a vehicle bumper;

FIG. 6 is a back view of a main body portion of a crossing arm guide of the mounting arrangement of FIGS. 1 and 2;

FIG. 7 is a cross-sectional side view of the main body portion of FIG. 6 taken along line 7—7 of FIG. 6;

FIG. 8 is a back view of a guide adapter portion of the crossing arm guide of the mounting arrangement of FIGS. 1 and 2;

FIG. 9 is a cross-sectional side view of the guide adapter portion of FIG. 8 taken along line 9—9 of FIG. 8;

FIG. 10 is a top view of the guide adapter of FIG. 8; and

PREFERRED EMBODIMENT DESCRIPTION

Figure 11:
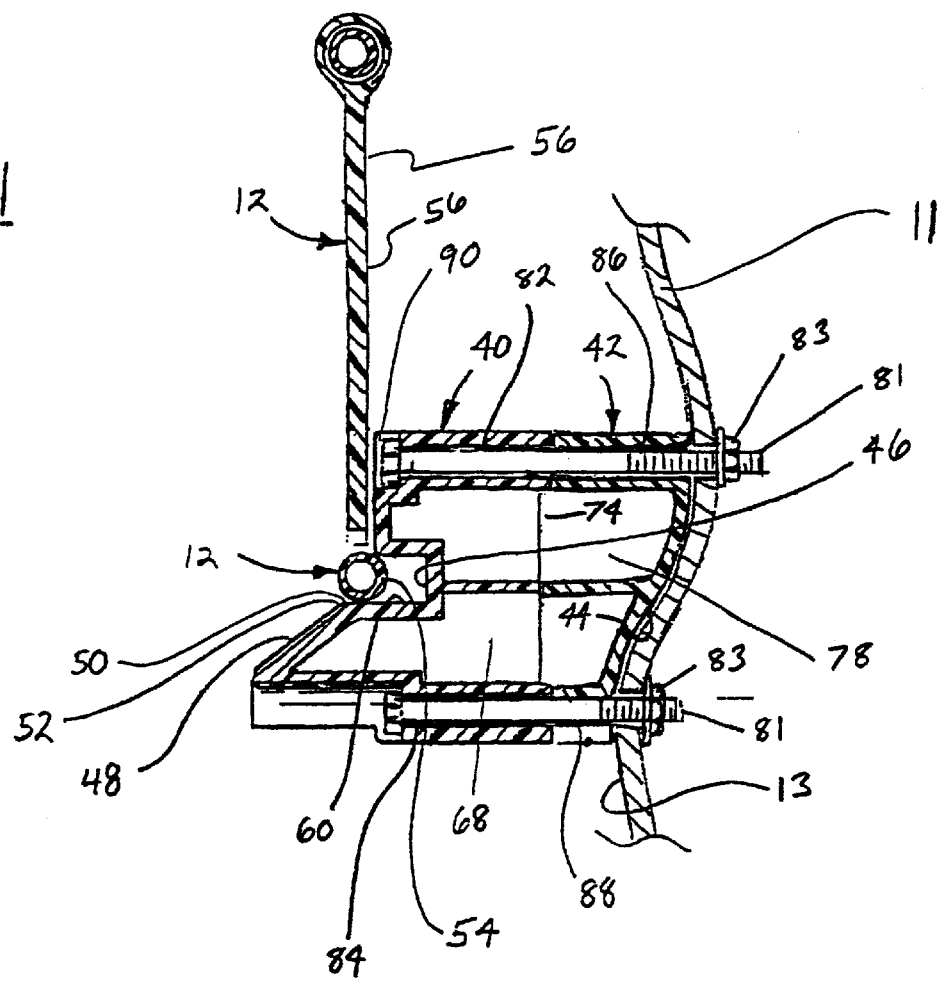
FIG. 11 is a cross sectional side view of the guide mounted on a bumper and the crossing arm resting on the guide.

A crossing arm assembly is generally shown at 10 in FIGS. 1, 2 and 5. The assembly 10 attaches to a bumper 11 at the front end of a vehicle. The assembly includes an elongated horizontally oriented arm or beam generally indicated at 12 in FIGS. 1, 2 and 11. The beam 12 swings out from a stowed position along the front bumper 11 to block pedestrian traffic from crossing immediately in front of the vehicle when the vehicle is stopped. The crossing arm assembly 10 also includes a mounting bracket generally indicated at 14 in FIGS. 1, 2 and 5. The mounting bracket 14 is configured to fixedly mount to the front bumper 11. The crossing arm beam 12 has an inner end pivotally supported on the mounting bracket 14. The mounting bracket 14 includes a back surface 16 having a non-planar profile contoured to complement the profile of a front surface 13 of a vehicle bumper.

The mounting bracket 14 includes a generally square face plate 18 that is part of a bracket adapter. The bracket adapter 20 has a generally square body 21 that matches the shape of the face plate 18. The contoured back surface 16 of the mounting bracket 14 is an integral part of the bracket adapter 20.

Vehicle bumpers include front surfaces having profiles common to the bumpers of vehicles of the same make and model. Therefore, the bracket adapter 20 is configured to be interchangeable with other bracket adapters having different back surface 16 profiles. These bracket adapter back surface 16 profiles are manufactured with different back surface 16 profiles to conform to the correspondingly different front surface bumper profiles of various vehicle makes and models. The interchangeability of the bracket adapters with differing back surface 16 profiles allows identically manufactured crossing arm assemblies to be fit to the bumpers of vehicles of different makes and models. This is done by including the appropriate bracket adapter 20 with the mounting bracket 14 for shipping during manufacturing. In addition, the mounting bracket 14 may be removed from one vehicle and adapted to a different vehicle by interchanging the bracket adapter 20.

The body 21 of bracket adapter 20 comprises a vibration dampening material such as structural foam that dampens vibrations transmitted between the bus and the crossing arm assembly 10. The material also distributes compressive loads created by fasteners 23 used to attach the bracket adapter 20 to a bumper. The material also distributes torsional and shear loads imparted by the weight of the cantilevered beam 12 to the fasteners. The face plate 18 is preferably a flat steel plate that is bonded to the bracket body 21.

As best shown in FIG. 2, the body 21 of bracket adapter 20 has a thickness that is tapered and includes a slightly concave curvature on the contoured back surface 16 of the adapter 20. The thickness of the bracket adapter 20 is tapered from its thickest point at a laterally outer edge 22 of the bracket adapter 20 to its thinnest point at a laterally inner edge 24 of the bracket adapter 20 disposed opposite the outer edge 22. The outer edge 22 of the bracket adapter 20 is the lateral edge disposed closest to an end of the bumper on a side of the vehicle that the bracket 14 is mounted on. The slightly concave tapered profile compensates for the "sweep" of the bumper, i.e., the bumper's curvature and angle relative to a central longitudinal vehicle axis. The bracket adapter 20 allows the crossing arm beam 12 to lie perpendicular to a central longitudinal vehicle axis when the beam 12 is in the stowed position.

The mounting bracket 14 includes a main body assembly generally indicated at 26 in FIGS. 1 and 2. The main body assembly 26 includes electrical and mechanical components for pivoting arm 12 between the stowed position shown in FIGS. 1 and 2 and the blocking position generally perpendicular to the stowed position. A suitable assembly is disclosed in my U.S. Pat. No. 5,719,553 issued Feb. 17, 1998, which is hereby incorporated in this patent specification by reference.

A gasket, shown at 28 in FIGS. 2 and 3, which has the same approximate square dimensions as the face plate 18 is sandwiched between the main body assembly 26 and the face plate 18 of the bracket adapter 20. The gasket 28 is made of a vibration dampening material such as neoprene to aid in dampening vibrations transmitted between the crossing arm assembly 10 and the vehicle. The gasket 28 also helps distribute fastener loads.

To fasten the mounting bracket 14 to bumper 11, the face plate 18 and body 21 of bracket adapter 20 each include a first group of four through holes or bolt holes shown at 30 in FIGS. 4 and 5. As shown in FIG. 4, the first group of four bolt holes 30 is arranged in a diamond-shaped pattern. A fifth through-hole or wiring hole is disposed in a corner of bracket adapter 20 and gasket 28 as shown at 32 in FIG. 3 and at 33 in FIG. 4. The face plate 18 and body 21 of bracket adapter 20 each include a second set of four through holes or bolt holes as shown at 34 in FIG. 4. The second set of bolt holes 34 is arranged in a rectangular pattern along opposite side edges of the bracket adapter 20. There is also a corresponding set of bolt holes in the gasket 28 as shown at 36 in FIG. 3.

The bracket adapter 20 is attached to bumper 11 with nuts 25 and bolts 23 using the first group of four bolt holes 30 as shown in FIG. 5. The main body assembly 26 is then attached to the bracket adapter 20 with fasteners using the second group of four bolt holes 34, 36.

The crossing arm assembly 10 also includes a two-piece crossing arm guide. A front piece of the crossing arm guide is generally indicated at 40 in FIGS. 1, 2, 6, 7 and 11. An adapter portion of the crossing arm guide is generally indicated at 42 in FIGS. 2, 8 and 11. The crossing arm guide 40, 42 supports the beam 12 in a stowed position generally parallel to bumper 11. Arm guide 40, 42 comprises a generally vertical guide back surface shown at 44 in FIG. 9. The guide back surface 44 is configured to attach to bumper 11 at a location spaced laterally from the point along the bumper where the mounting bracket 14 is attached preferably near the end of arm 12 and the opposite end of the bumper 11. As is best shown in FIG. 7 a generally vertical guide front surface 46 is disposed opposite the guide back surface 44. As shown in the same figure a generally upward-facing ramped surface 48 extends outward and downward from the front surface 46. The arm guide 40 is attached to a vehicle bumper in a position where the ramped surface 48 can receive and guide a slightly sagging crossing arm beam 12 upward into the stowed position as the beam 12 swings inward against the bumper.

Arm guide main body 40 includes a generally horizontal upward-facing surface 50 that extends between front surface 46 and an inner upper end 52 of the ramped surface 48. Surface 50 is positioned such that a slightly sagging crossing arm beam 12 can slide up ramped surface 48, onto horizontal surface 50 and into the stowed position on horizontal surface 50. This allows crossing arm beam 12 to rest on horizontal surface 50 in the stowed position which helps to support the free end of the beam 12 vertically against sagging as shown in FIG. 11. Unlike an outwardly ramped surface, horizontal surface 50 will not urge beam 12 to slide forward—away from bumper 11 and out of the stowed position.

As best shown in FIGS. 9 and 11 and similar to mounting bracket 14, back surface 44 of the guide has a non-planar contoured profile. Back surface 44 is contoured to complement or conform to the contours of the non-planar front surface 13 of bumper 11 at the point along bumper 11 where arm guide 40, 42 is to be attached to bumper 11. Because it conforms to the contours of front surface 13 of bumper 11, guide back surface 44 provides maximum surface area contact with bumper 11 resulting in a firmer, more rigid attachment.

Contoured guide back surface 44 is disposed on adapter 42. Adapter 42 is detachable and interchangeable with other adapters having differing back surface profiles. The back surfaces of the adapters are contoured to conform to correspondingly different front surface profiles found on the bumpers of different vehicle makes and models. This allows the guides to be attached to the same bumper profiles as the brackets.

Guide 40 includes a downward-facing generally horizontal surface, shown at 58 in FIG. 7, that extends integrally outward from front surface 46. Horizontal surface 58 is spaced opposite the upward-facing horizontal surface 50 and forms a guide socket 60. Guide socket 60 is dimensioned to receive a lower rod member 54 of beam 12 when beam 12 is in the stowed position. When beam 12 in the stowed position lower rod member 54 and guide socket 60 cooperate to prevent beam 12 from bouncing vertically on arm guide 40.

Both arm guide main body 40 and arm guide adapter 42 are made of plastic by injection molding. However, in other embodiments arm guide adapter 42 may, similar to bracket adapter 20, comprise a solid block of vibration dampening material such as structural foam. Vibration dampening material may be used to dampen vibrations transmitted between the bus and the crossing arm assembly 10.

As shown in FIGS. 6-9, both arm guide main body 40 and arm guide adapter 42 are hollow and open at respective interfacing surfaces 62, 64. In other words, arm guide main body 40 is open at the back opposite front surface 46 and arm guide adapter 42 is open at the front, opposite contoured guide back surface 44. Because their interfacing surfaces 62, 64 are open, arm guide main body 40 and arm guide adapter 42 are configured to interlock rim-to-rim. To effect this interlock, two opposing side walls 66, 68 of arm guide main body 40 include respective elongated vertical key slots or grooves 70, 72. Slots 70, 72 are dimensioned to receive a pair of elongated vertical keys 74, 76 that integrally extend from respective opposing side walls 78, 80 of arm guide adapter 42. Interlocking keys 74, 76 and key slots 70, 72 prevent arm guide main body 40 and arm guide adapter 42 from sliding laterally or vertically relative to one another.

To fasten arm guide main body 40 and arm guide adapter 42 to bumper 11, arm guide main body 40 and arm guide adapter 42 each include a pair of vertically-spaced through-bores or bolt holes for receiving attachment hardware such as bolts 81 and nuts 83. The bolt holes of arm guide main body 40 are shown at 82 and 84 in FIGS. 6 and 7. The bolt holes of arm guide adapter 42 are shown at 86 and 88 in FIGS. 8 and 9. The bolt holes 82, 84, 86, 88 of arm guide main body 40 and arm guide adapter 42 are positioned to concentrically align with each other when arm guide main body 40 and arm guide adapter 42 are assembled together with keys 74, 76 engaged within key slots 70, 72. On arm guide main body 40, bolt holes 82, 84 are counter-sunk as shown at 90 in FIG. 7. Bolt holes 82, 84 are counter-sunk to prevent fastener heads from touching or otherwise interfering with beam 12 in the stowed position.

In practice, crossing arm assembly 10 is made by providing a mounting bracket 14 having a bracket main body 26 and a bracket adapter 20 as described above. Bracket adapter 20 is constructed to include a back surface 16 profile contoured to complement the non-planar front surface profile of the bumper of the make and model of vehicle the assembly 10 is to be mounted to. Bracket adapter 20 is then attached to bracket main body 26 with the gasket 28 sandwiched between the bracket adapter 20 and the bracket main body 26. Beam 12 is pivotally supported on main body 26 of mounting bracket 14 and mounting bracket 14 is attached to the bumper. Beam 12 may be pivotally supported on main body 26 of the mounting bracket 14 by any means known in the art.

The crossing arm assembly 10 is attached to bumper 11 by first drilling nine holes in bumper 11 at a point along bumper 11 where mounting bracket 14 is to be attached. Bracket adapter 20 may be used as a template to mark the proper positions of the eight bolt holes and single wiring hole before drilling the bumper. Likewise, the arm guide adapter 42 may be used as a template to mark the proper positions for two bolt holes necessary to mount arm guide 40, 42 to bumper 11. Bracket adapter 20 and arm guide 40, 42 are then attached to bumper 11 by passing bolts 23, 81 through their respective bolt holes 30, 82–88 and four of the corresponding newly-drilled bolt holes in the bumper. Any electrical wiring required to operate lights or a crossing arm drive motor are routed through the concentric wiring holes 32, 33 of the mounting bracket 14 and the corresponding hole in bumper 11 as main body 26 is attached to bracket adapter 20. Main body 26 is attached to bracket adapter 20 by four bolts shown-at 92 in FIGS. 1, 2 and 5. Bolts 92 pass through main body 26, gasket 28, adapter 20 and bumper 11 via holes 34, 36 and corresponding holes drilled in bumper 11. Four nuts (not shown) secure bolts 92 to bumper 11.

The disclosed embodiment is representative of a presently preferred form of the invention, and is intended to be illustrative rather than definitive thereof. The invention is defined in the claims.

I claim:

1. A crossing arm assembly that pivotally attaches to a bumper at the front end of a vehicle to block pedestrian traffic from crossing immediately in front of the vehicle when the vehicle is stopped, the crossing arm assembly comprising:

a mouting bracket configured to fixedly mount to the front bumper of a vehicle, the front bumper having a front surface having a profile common to the bumpers of other vehicles of the same make and model;

an elongated beam having an inner end pivotally supported on the mounting bracket;

the mounting bracket including a bracket adapter that has a back surface having a profile contoured to complement the profile of the front surface of the bumper, and that is interchangeable with other bracket adapters having different back surface profiles contoured to conform to correspondingly different from surface bumper profiles of other vehicle makes and models.

2. A crossing arm assembly that pivotally attaches to a bumper at the front end of a vehicle to block pedestrian traffic from crossing immediately in front of the vehicle when the vehicle is stopped, the crossing arm assembly comprising:

a mounting bracket configured to fixedly mount to the front bumper of a vehicle, the front bumper having a front surface having a profile common to the bumpers of other vehicles of the same make and model;

an elongated beam having an inner end pivotally supported on the mounting bracket;

the mounting bracket including a bracket adapter having a back surface having a profile contoured to complement the profile of the front surface of the bumper, and the bracket adapter having a thickness, the thickness being tapered from a laterally outer edge of the bracket adapter to a laterally inner edge of the bracket adapter.

3. A crossing arm assembly that pivotally attaches to a bumper at the front end of a vehicle to block pedestrian traffic from crossing immediately in front the vehicle when the vehicle is stopped, the crossing arm assembly comprising:

a mounting bracket configured to fixedly mount to the front bumper of a vehicle, the front bumper having a front surface having a profile common to the bumper of other vehicles of the same make and model;

elongated beam having an inner end pivotally supported on the mounting bracket;

the mounting bracket including a bracket adapter having a back surface having a profile contoured to complement the profile, of the front surface of the bumper, and a guide comprising a back surface configured to attach to the bumper at a location spaced laterally from the mounting bracket;

a front surface disposed opposite the back surface;

a generally upward-facing ramped surface extending outward and downward from the front surface, and the guide including a generally horizontal upward-facing surface extending between the front surface and an inner upper end of the ramped surface.

4. A crossing arm assembly that pivotally attaches to a bumper at the front end of a vehicle to block pedestrian traffic from crossing immediately in front of the vehicle when the vehicle is stopped, the crossing arm assembly comprising:

a mounting, bracket configured to fixedly mount to the front bumper of a vehicle, the front bumper having front surface having a profile common to the bumpers of other vehicles of the same make and model;

an elongate beam having an inner end pivotally supported on the mounting bracket;

the mounting bracket including a bracket adapter having a back surface having a profile contoured to complement the profile of the front surface of the bumper, a guide comprising a back surface configured to attach to the bumper at a location spaced laterally from the mounting bracket;

a front surface disposed opposite the back surface;

a generally upward-facing ramped surface extending outward and downward from the front surface, the guide back surface having a non-planar profile contoured to conform to the profile of the non-planar front surface of the bumper, and the guide including a guide main body and a guide adapter configured to connect to the guide main body, the back surface of the guide being disposed on the guide adapter.

5. A crossing arm assembly as defined in claim 4 in which the guide adapter is configured to be interchangeable with other guide adapters having different back surface profiles contoured to conform to correspondingly different front surface profiles.

6. A crossing arm assembly as defined in claim 4 in which the guide adapter comprises a vibration dampening material.

7. A crossing arm assembly that pivotally attaches to a bumper at the front end of a vehicle to block pedestrian traffic from crossing immediately in front of the vehicle when the vehicle is stopped, the crossing arm assembly comprising:

a mounting bracket configured to fixedly mount to the front bumper of a vehicle, the front bumper having a front surface having a profile common to the bumpers of other vehicles of the same make and model;

an elongated beam having an inner end pivotally supported on the mounting bracket;

the bracket including a back surface having a non-planar profile contoured to complement the profile of the front surface of the bumper, a guide having a back surface configured to attach to the bumper at a location spaced laterally from the mounting bracket; a front surface disposed opposite the back surface; and a generally upward-facing ramped surface extending outward and downward from the front surface, the guide including a generally horizontal upward-facing surface extending between the front surface and an inner upper end of the ramped surface, the beam including a rod member that provides a longitudinal protrusion that extends laterally inward toward the bumper from a bumper-side of the beam; and the guide including a downward-facing generally horizontal surface extending outward from the front surface, spaced opposite the upward-facing horizontal surface to form a guide socket, the guide socket dimensioned to receive the rod member when the beam is in the stowed position.

8. A crossing arm assembly that pivotally attaches to a bumper at the front end of a vehicle to block pedestrian traffic from crossing immediately in front of the vehicle when the vehicle is stopped, the crossing arm assembly comprising;

a mounting bracket configured to fixedly mount to the front bumper of a vehicle, the front bumper having a front surface having a profile;

an elongated beam having an inner end pivotally supported on the mounting bracket; and the mounting bracket including a bracket adapter having a back surface having a profile contoured to complement the profile of the front surface of the bumper, the bracket adapter comprising a body of structural foam and a metal face plate that is bonded to the body of structual foam, the body of structural foam and the metal face plate having a first series of holes for attaching the bracket adapter to the bumper of the vehicle, the body of structural foam and the metal face plate having a second series of holes, and the mounting bracket including a main body portion that is attached to the brackcet adapter via the second series of holes.

9. The crossing arm assembly as defined in claim 8 further including a gasket between the main body portion and the metal face plate of the bracket adapter.

* * * * *

UNITED STATES PATENT AND TRADEMARK OFFICE
CERTIFICATE OF CORRECTION

| | |
|---|---|
| PATENT NO. | : 6,254,151 B1 |
| DATED | : July 3, 2001 |
| INVENTOR(S) | : Ronald C. Lamparter |

It is certified that error appears in the above-identified patent and that said Letters Patent is hereby corrected as shown below:

<u>Column 3,</u>
Line 25, remove "15" at the end of "downward".

<u>Column 8,</u>
Line 39, change "bumper" to -- bumpers --.
Line 41, insert -- an -- before "elongated".
Line 46, remove the comma after "profile".

Signed and Sealed this

Nineteenth Day of March, 2002

Attest:

Attesting Officer

JAMES E. ROGAN
*Director of the United States Patent and Trademark Office*